United States Patent
Kakino

(10) Patent No.: US 10,108,830 B2
(45) Date of Patent: Oct. 23, 2018

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventor: Tomonari Kakino, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/253,955

(22) Filed: Sep. 1, 2016

(65) Prior Publication Data

US 2016/0371564 A1 Dec. 22, 2016

Related U.S. Application Data

(62) Division of application No. 14/074,045, filed on Nov. 7, 2013.

(30) Foreign Application Priority Data

Nov. 8, 2012 (JP) .................................. 2012-246199

(51) Int. Cl.
  *G06K 9/00* (2006.01)
  *G06K 7/10* (2006.01)
  (Continued)

(52) U.S. Cl.
  CPC ........... *G06K 7/10722* (2013.01); *G06K 9/00* (2013.01); *G06K 9/4604* (2013.01); *G06K 9/62* (2013.01);
  (Continued)

(58) Field of Classification Search
  None
  See application file for complete search history.

(56) References Cited

U.S. PATENT DOCUMENTS

| 5,546,475 A | 8/1996 | Bolle et al. |
| 5,631,976 A | 5/1997 | Bolle et al. |

(Continued)

FOREIGN PATENT DOCUMENTS

| JP | 2002-74511 | 3/2002 |
| JP | 2008-033640 | 2/2008 |

(Continued)

OTHER PUBLICATIONS

U.S. Final Office Action for U.S. Appl. No. 14/074,045 dated Feb. 2, 2016.

(Continued)

*Primary Examiner* — Weiwen Yang
(74) *Attorney, Agent, or Firm* — Amin, Turocy & Watson LLP

(57) ABSTRACT

A commodity recognition apparatus comprises an image interface, a memory and a processor. The image interface is configured to acquire a commodity image captured by a camera. The memory is configured to store a candidate of a commodity recognized from the commodity image acquired by the image interface. The processor is configured to try to read a commodity recognition code from the commodity image acquired by the image interface and reset the candidate of the commodity stored in the memory if the commodity recognition code is read.

6 Claims, 7 Drawing Sheets

(51) Int. Cl.
*G06K 9/46* (2006.01)
*G06K 9/62* (2006.01)
*H04N 7/18* (2006.01)

(52) U.S. Cl.
CPC .......... *G06K 9/6215* (2013.01); *H04N 7/183* (2013.01); *G06K 2209/17* (2013.01)

(56) References Cited

U.S. PATENT DOCUMENTS

| | | |
|---|---|---|
| 6,005,959 A | 12/1999 | Mohan et al. |
| 6,310,964 B1 | 10/2001 | Mohan et al. |
| 2008/0199044 A1 | 8/2008 | Tsurumi |
| 2009/0245573 A1 | 10/2009 | Saptharishi et al. |
| 2010/0030664 A1 | 2/2010 | Omori |
| 2010/0092093 A1 | 4/2010 | Akatsuka et al. |
| 2010/0141779 A1 | 6/2010 | Rhoads |
| 2011/0243446 A1* | 10/2011 | Iizaka ............. G06Q 30/0207 382/182 |
| 2012/0104098 A1 | 5/2012 | Matsuda |
| 2012/0269389 A1 | 10/2012 | Nakano et al. |
| 2013/0279748 A1 | 10/2013 | Hastings |

FOREIGN PATENT DOCUMENTS

| | | |
|---|---|---|
| JP | 2010-198137 | 9/2010 |
| JP | 2010-237886 | 10/2010 |
| JP | 2012-069092 | 4/2012 |
| JP | 2012-94073 | 5/2012 |

OTHER PUBLICATIONS

U.S. Office Action for U.S. Appl. No. 14/074,045 dated Jun. 10, 2016.
U.S. Office Action for U.S. Appl. No. 14/074,045 dated Aug. 12, 2015.
Non-Final Office Action for U.S. Appl. No. 14/074,045 dated Dec. 22, 2016, 31 Pages.
Final Office Action for U.S. Appl. No. 14/074,045 dated Sep. 29, 2016, 27 Pages.
Japanese Office Action for Japanese Patent Application No. 2017-082802 dated Feb. 20, 2018.
Final Office Action for U.S. Appl. No. 15/253,950 dated Jun. 14, 2018, 35 Pages.

\* cited by examiner

FIG.3

| COMMODITY ID | COMMODITY NAME | COMMODITY IMAGE 0 | FEATURE AMOUNT DATA 0 |
| --- | --- | --- | --- |
| | | COMMODITY IMAGE 1 | FEATURE AMOUNT DATA 1 |
| | | COMMODITY IMAGE 2 | FEATURE AMOUNT DATA 2 |
| | | COMMODITY IMAGE 3 | FEATURE AMOUNT DATA 3 |
| | | COMMODITY IMAGE 4 | FEATURE AMOUNT DATA 4 |
| | | ⋮ | ⋮ |
| | | COMMODITY IMAGE N | FEATURE AMOUNT DATA N |

| ORDER | COMMODITY ID | COMMODITY NAME | COMMODITY IMAGE | SIMILARITY DEGREE |
| --- | --- | --- | --- | --- |
| 1 | | | | |
| 2 | | | | |
| 3 | | | | |
| 4 | | | | |
| 5 | | | | |

| COMMODITY NAME | UNIT PRICE | QUANTITY | AMOUNT |
|---|---|---|---|
| ○○○○ | X |  | △△ |
|  |  |  |  |
|  |  |  |  |
|  |  |  |  |
|  |  |  |  |

701 — (left label for table row)
702 — (bottom bar)
703 — (right panel)
700 — (overall frame)

FIG.8

| COMMODITY NAME | UNIT PRICE | QUANTITY | AMOUNT |
|---|---|---|---|
| ○○○○ | X |  | △△ |
|  |  |  |  |
|  |  |  |  |
|  |  |  |  |
|  |  |  |  |

- APPLE — 711
- PERSIMMON — 712
- PEACH — 713

COMMODITY RECOGNITION APPARATUS AND COMMODITY RECOGNITION METHOD

CROSS-REFERENCE TO RELATED APPLICATIONS

This application is a Division of application Ser. No. 14/074,045 filed Nov. 7, 2013, the entire contents of which are incorporated herein by reference.

This application is based upon and claims the benefit of priority from Japanese Patent Application No. 2012-246199, filed Nov. 8, 2012, the entire contents of which are incorporated herein by reference.

FIELD

Embodiments described herein relate to a commodity recognition apparatus using a camera and a commodity recognition method for enabling a computer to function as the commodity recognition apparatus.

BACKGROUND

Barcode is one kind of data code attached to a commodity. Most of the commodities sold in a supermarket and the like are attached with a barcode including a commodity recognition code. A commodity recognition apparatus for recognizing the commodity recognition code by scanning the barcode with a scanner is being widely popularized.

However, not every commodity is attached with a barcode. For example, most commodities sold by retail such as vegetables, fruits, and deli food and the like are not attached with barcodes. Therefore, there exists a commodity recognition apparatus which uses a display device as a touch panel to deal with the commodity without a barcode. The apparatus displays an image of the commodity without a barcode on a screen of the touch panel. If the image of the commodity is selected through a touch input by an operator, the commodity recognition apparatus determines the commodity recognition code associated with the selected image of the commodity.

BRIEF DESCRIPTION OF THE DRAWINGS

FIG. 3 is a schematic view illustrating a structure of dictionary data for each commodity stored in a recognition dictionary file;

FIG. 4 is a schematic view illustrating an area structure of a candidate commodity memory;

FIG. 7 is a plan view illustrating one example of a registration screen;

FIG. 8 is a plan view illustrating one example that a commodity candidate is displayed on the registration screen.

DETAILED DESCRIPTION

In accordance with one embodiment, a commodity recognition apparatus comprises an image interface, a memory and a processor. The image interface acquires a commodity image captured by a camera. The memory stores a candidate of a commodity recognized from the commodity image acquired by the image interface. The processor tries to read a commodity recognition code from the commodity image acquired by the image interface and resets the candidate of the commodity stored in the memory if the commodity recognition code is read.

The present embodiment illustrates a case where functions according to the present invention are applied to a commodity recognition apparatus included in a store checkout system of a retail store.

First, the commodity recognition apparatus of the present embodiment adopts a technology of general object recognition. The general object recognition is a technology in which the category and the like of an object are recognized from the image data of the object captured by a camera. A computer extracts appearance feature amount of the object contained in the image from the image data. Then the computer calculates the similarity degree by comparing the extracted appearance feature amount with the feature amount data of a reference image registered in the recognition dictionary file, and then recognizes the category and the like of an object based on the similarity degree. A technology for recognizing an object contained in an image is disclosed in the following document.

Keiji Yanai "Current status and future direction of general object recognition", Journal of Information Processing Society, Vol. 48, No. SIG16 [Search on Heisei 22 Aug. 10], Internet <URL: http://mm.cs.uec.ac.jp/IPSJ-TCVIM-Yanai.pdf>

In addition, the technology carrying out the general object recognition by area division of the image for each object is described in the following document.

Jamie Shotton etc, "Semantic Texton Forests for Image Categorization and Segmentation", [Search on Heisei 22 Aug. 10], Internet <URL: http://citeseerx.ist.psu.edu/viewdoc/download?doi=10.1.1.145.3036&rep=repl&type=pdf>

A First Embodiment

Figure 1:
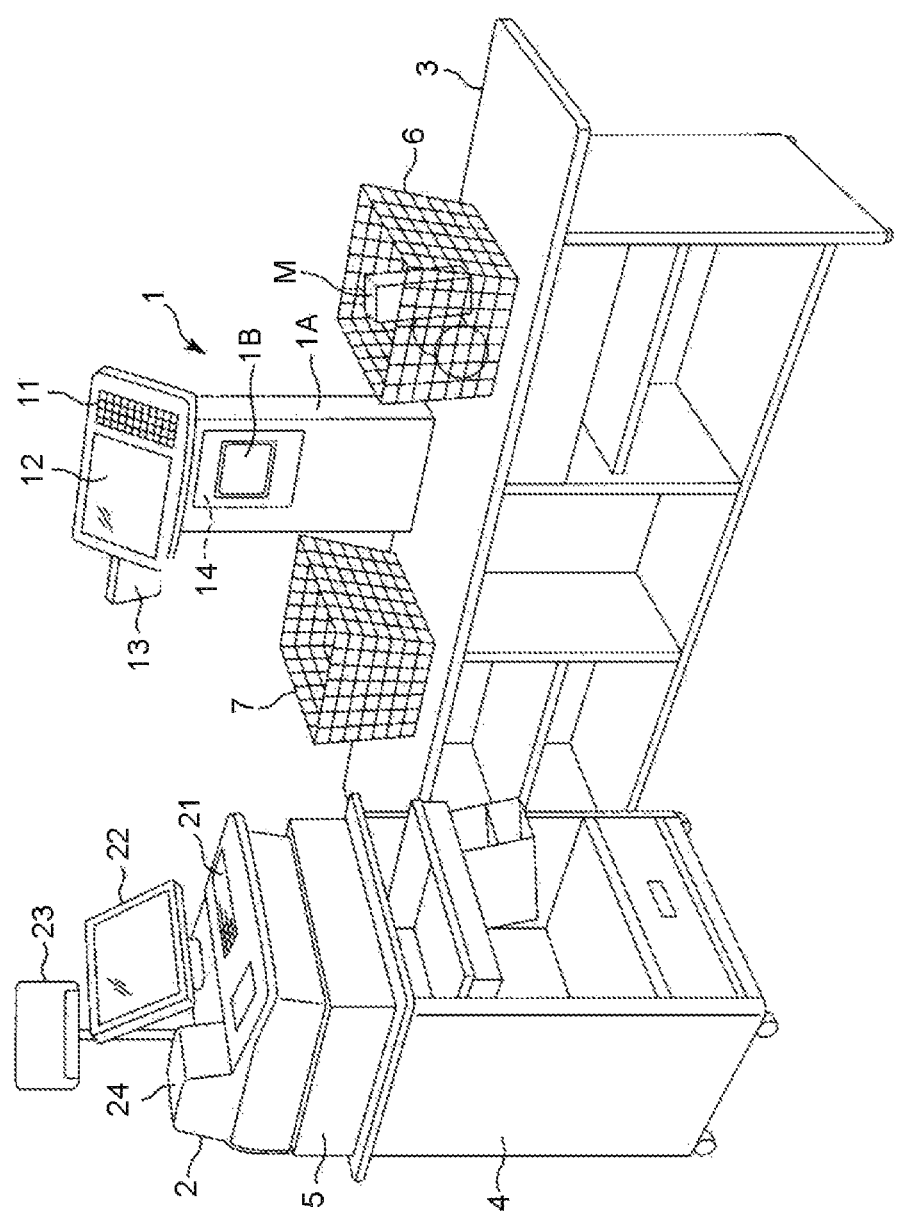
FIG. 1 is an external view of a store checkout system.

FIG. 1 is an external view of a store checkout system. The system comprises a commodity recognition apparatus 1 for recognizing a commodity purchased by a customer and a POS terminal 2 for registering sales data of the commodity recognized by the commodity recognition apparatus 1. The commodity recognition apparatus 1 is mounted on a checkout counter 3. The POS terminal 2 is arranged on a register table 4 via a drawer 5. The POS terminal 2 comprises a keyboard 21, a display for operator 22, a display for customer 23 and a receipt printer 24 which serve as devices required for settlement. The commodity recognition apparatus 1 is electrically connected with the POS terminal 2 through a communication cable 400 (referring to FIG. 2).

The checkout counter 3 is formed in an elongated-shape along a customer passage at the rear side of the checkout counter. The register table 4 is arranged substantially perpendicular to the checkout counter 3 in the nearer side of the end of the checkout counter 3 at the downstream side in the movement direction of a customer moving along the checkout counter 3. The checkout counter 3 and the register table 4 define a space for a shop clerk in charge of settlement, i.e., so called casher.

The commodity recognition apparatus 1 comprises a keyboard 11, a touch panel 12 and a display for customer 13. These display and input devices (the keyboard 11, the touch panel 12 and the display for customer 13) are mounted on a housing 1A constituting a main body of the commodity recognition apparatus 1. The housing 1A in a thin rectangular shape is vertically arranged at the approximate center of the checkout counter 3. The keyboard 11 and the touch panel 12 are respectively arranged on the housing 1A in a manner that an operation surface faces the cashier. The display for customer 13 is arranged on the housing 1A in a manner that a display surface faces the customer passage.

A camera 14 is arranged in the housing 1A. In addition, a rectangular reading window 1B is formed on the front side (cashier side) of the housing 1A. The camera 14 comprises a CCD (Charge Coupled Device) image capturing element serving as an area image sensor and a drive circuit thereof, and an image capturing lens used for focusing an image of an image capturing area on the CCD image capturing element. The image capturing area refers to an area of a frame image focused in an area of the CCD image capturing element by the image capturing lens from the reading window 1B. The camera 14 outputs the image focused in the image capturing area of the CCD image capturing element through the image capturing lens.

In addition, the camera 14 is not limited to a configuration mentioned above. In the present embodiment, devices having a function of capturing a commodity are all included in the scope of the camera 14.

A first upper surface portion of the checkout counter 3 at the upstream side of the commodity recognition apparatus 1 in the customer movement direction serves as a space for placing a shopping basket 6 in which an unregistered commodity M purchased by a customer is held. On the other side, a second upper surface portion at the downstream side of the commodity recognition apparatus 1 serves as an another space for placing a shopping basket 7 in which a commodity M recognized by the commodity recognition apparatus 1 is held.

Figure 2:
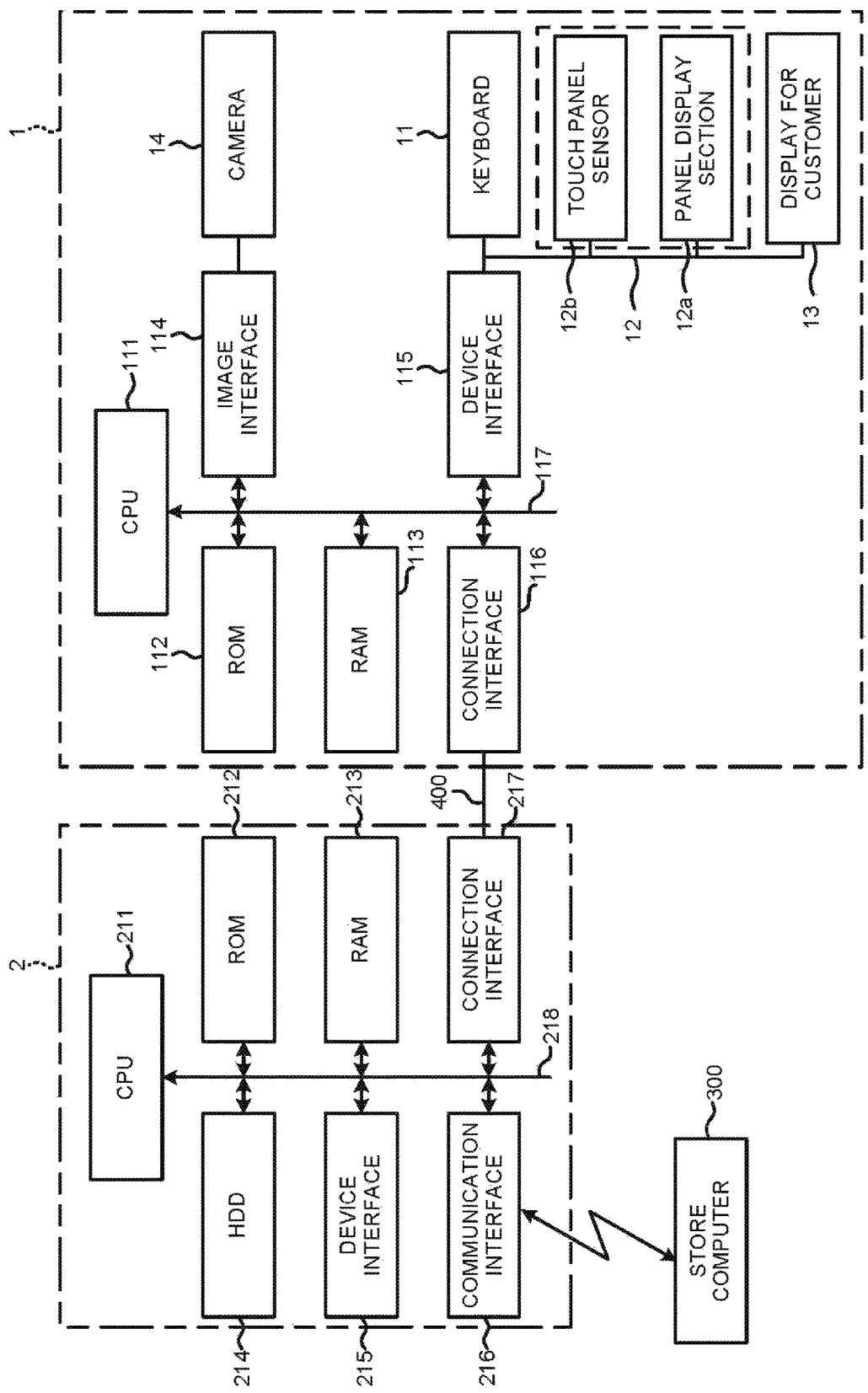
FIG. 2 is a block diagram illustrating hardware arrangements of a commodity recognition apparatus and a POS terminal.

FIG. 2 is a block diagram illustrating hardware arrangements of the commodity recognition apparatus 1 and the POS terminal 2. The commodity recognition apparatus 1 includes a main control section, a main storage section and an input-output section. A CPU (Central Processing Unit) 111 serves as the main control section. A ROM (Read Only Memory) 112 and a RAM (Random Access Memory) 113 serve as the main storage section. An image interface 114, a device interface 115 and a connection interface 116 serve as the input-output section. The CPU 111 is connected with the ROM 112, the RAM 113 and each interface 114, 115 and 116 through a bus line 117 such as an address bus, a data bus and the like.

In addition, the main control section can be also a processor except a CPU. In addition, the input-output section can include other interface.

The image interface 114 is connected with the camera 14. The image captured by the camera 14 is acquired by the commodity recognition apparatus 1 through the image interface 114, and is stored in the RAM 113. The device interface 115 is connected with the keyboard 11, the touch panel 12 and the display for customer 13. The touch panel 12 includes a panel display section 12a and a touch panel sensor 12b. The touch panel sensor 12b is overlaid on a screen of the panel display section 12a.

The POS terminal 2 includes a main control section, a main storage section, an auxiliary storage section and an input-output section. A CPU 211 serves as the main control section. A ROM 212 and a RAM 213 serve as the main storage section. An HDD (Hard Disk Drive) 214 serves as the auxiliary storage section. A device interface 215, a communication interface 216 and a connection interface 217 serve as the input-output section. The CPU 211 is connected with the ROM 212, the RAM 213, the HDD 214 and each interface 215, 216 and 217 through a bus line 218 such as an address bus, a data bus and the like.

In addition, the main control section can be also a processor except a CPU. In addition, the input-output section can include other interface. In addition, the auxiliary storage section is not limited to the HDD 214. For example, a SSD (Solid State Drive) can be also used as the auxiliary storage section.

The device interface 215 is connected with the keyboard 21, the display for operator 22, the display for customer 23, the printer 24 and the drawer 5 which are omitted in FIG. 2.

The communication interface 216 is connected with a store computer 300 serving as the center of a store through a network such as a LAN (Local Area Network) and the like. Through the connection, the POS terminal 2 can carry out data transmission/reception with the store computer 300. For example, the POS terminal 2 receives a recognition dictionary file 500 which will be described later from the store computer 300 through the communication interface 216. The recognition dictionary file 500 is stored in the HDD 214.

The connection interface 217 is connected with the connection interface 116 of the commodity recognition apparatus 1 through the communication cable 400. Through the connection, the POS terminal 2 displays commodity sales data on the touch panel 12 and the display for customer 13 of the commodity recognition apparatus 1. The commodity recognition apparatus 1 can access the recognition dictionary file 500 stored in the HDD 214 of the POS terminal 2.

In the present embodiment, the commodity without a barcode is used as a recognition target commodity. The recognition dictionary file 500 stores dictionary data for each recognition target commodity. FIG. 3 is a schematic view illustrating a structure of the dictionary data. As shown in FIG. 3, for each recognition target commodity, a plurality of pairs of commodity image data 0 to N and feature amount data 0 to N are stored in the recognition dictionary file 500 in association with a commodity ID and a commodity name. The commodity ID is the commodity recognition code for recognizing the commodity. In addition, the commodity ID mentioned above is included in the barcode attached to the commodity.

The commodity image data 0 to N are the image data obtained by capturing a commodity recognized using a corresponding commodity ID from various directions. The feature amount data 0 to N are data obtained by extracting appearance feature amount serving as surface information (an appearance shape, a hue, a pattern, a concave-convex state and the like) of the commodity from corresponding commodity image data 0 to N and parameterizing the appearance feature amount.

In addition, the number (n+1) of the image data and the feature amount data relative to one commodity is not fixed. The number (n+1) of the image data and the feature amount data is different according to the commodity. In addition, the image data 0 to N are not all stored in the recognition dictionary file 500, and any one image data can be stored in the recognition dictionary file 500.

The commodity recognition apparatus 1 has a reading function, a feature amount extraction function, a similarity degree calculation function, a candidate registration function, a candidate output function and a determination function to determine a commodity M put in the image capturing area of the camera 14 to be a commodity for sale.

The reading function is used for reading the barcode attached to a commodity from an image of the commodity captured by the camera 14. In addition, the reading function may also be used for reading other data code, for example, a two-dimensional data code, instead of the barcode.

The feature amount extraction function is used for extracting appearance feature amount of a commodity from an image of the commodity captured by the camera 14. The similarity degree calculation function is used for comparing the appearance feature amount extracted by the feature amount extraction function with the feature amount data for each recognition target commodity stored in the recognition dictionary file 500. Afterwards, the similarity degree calculation function is used for calculating a similarity degree representing how similar the appearance feature amount is to the feature amount data for each recognition target commodity.

The candidate registration function is used for extracting a recognition target commodity as a candidate of a commodity for sale in the descending order of similarity degrees calculated through the similarity degree calculation function. Afterwards, the candidate registration function is used for registering information of the commodity serving as the candidate of the commodity for sale in a candidate commodity memory 600 which will be described later. The candidate output function is used for displaying and outputting the image of the commodity serving as the candidate of the commodity for sale on the touch panel 12. The determination function is used for determining the commodity selected through a touch operation from the commodity images displayed on the touch panel 12 as a commodity for sale.

In order to realize these functions, the commodity recognition apparatus 1 stores a commodity recognition program in the ROM 112. In addition, the commodity recognition apparatus 1 guarantees an area serving as the candidate commodity memory 600 in the RAM 113. As shown in FIG. 4, the candidate commodity memory 600 stores the data of the commodity ID, the commodity name, the commodity image and the similarity degree for each commodity ranked at the first to the fifth. In addition, in the candidate commodity memory 600, the order is not limited to be from the first to the fifth. For example, that how many numbers of data are stored can be randomly set by a user of a system.

Figure 5:
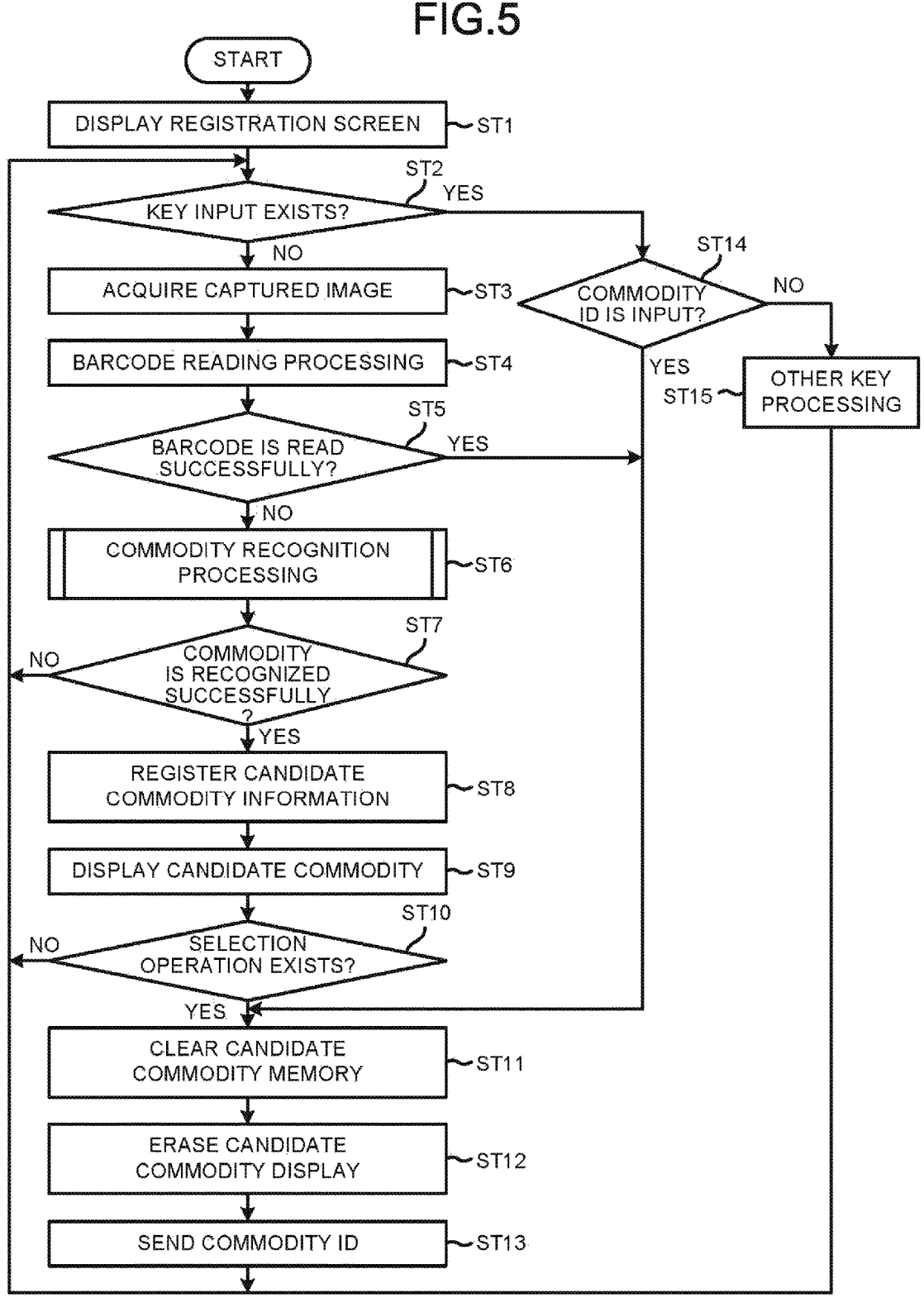
FIG. 5 is a flowchart illustrating one procedure of information processing executed by a CPU of the commodity recognition apparatus according to a commodity recognition program.

The CPU 111 of the commodity recognition apparatus 1 executes information processing in a procedure shown in a flowchart in FIG. 5 according the commodity recognition program. First, the CPU 111 displays a registration screen 700 on the panel display section 12a of the touch panel 12 (ACT ST1).

One example of the registration screen 700 is shown in FIG. 7. The registration screen 700 includes a detail area 701, a total area 702 and a candidate area 703. The commodity name, the unit price, the quantity and the amount of the commodity registered as a commodity for sale are displayed in the detail area 701. The total point and the total amount of the registered commodity are displayed in the total area 702. The commodity name and the commodity image stored in the candidate commodity memory 600 are displayed sequentially from the first one in the candidate area 703.

After displaying the registration screen 700, the CPU 111 confirms whether or not the keyboard 11 is operated (ACT ST2). If the keyboard is operated, a key code corresponding to an operation key is stored in a key buffer of the RAM 113 according to an operation procedure. Then, the CPU 111 confirms whether or not the key code is stored in the key buffer.

If the key code is not stored in the key buffer, the CPU 111 determines that a key input does not exist (NO in ACT ST2). In this case, the CPU 111 acquires the image (frame image) captured by the camera 14 through the image interface 114 (ACT ST3). The acquired image is stored in an image buffer of the RAM 113.

The CPU 111 analyzes the image stored in the image buffer to read the barcode (ACT ST4: reading function). A technology for reading the barcode based on image analysis is recorded in, for example, Japanese Unexamined Patent Application Publication No. 2008-033640.

The CPU 111 determines whether or not the barcode can be read from the image (ACT ST5). If the barcode cannot be read (NO in ACT ST5), the CPU 111 executes commodity recognition processing (ACT ST6).

Figure 6:
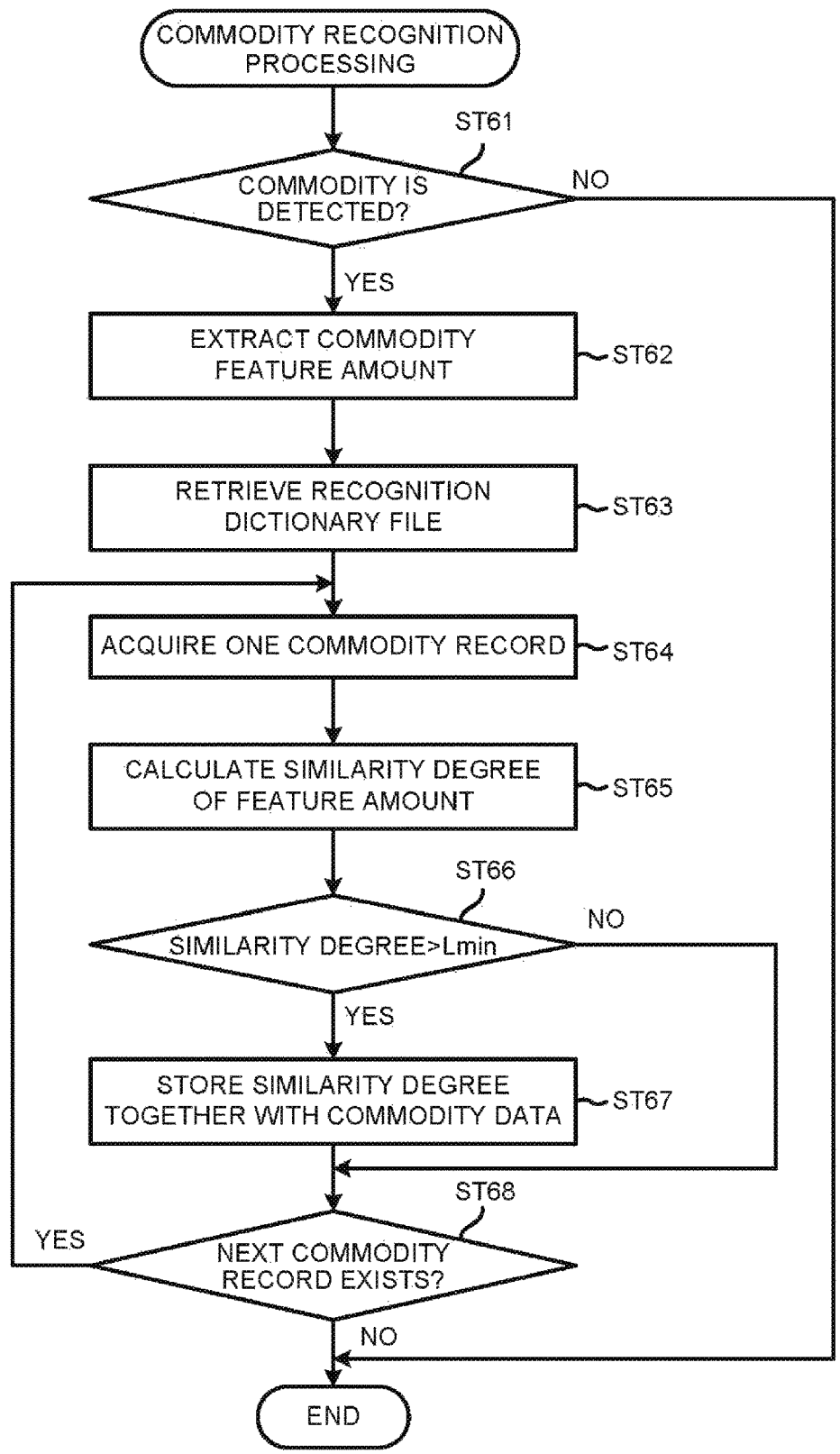
FIG. 6 is a flowchart specifically illustrating a procedure of commodity recognition processing in FIG. 5.

FIG. 6 is a flowchart specifically illustrating a procedure of the commodity recognition processing. First, the CPU 111 analyzes the image stored in the image buffer again, and confirms whether or not the commodity can be detected from the image (ACT ST61). Specifically, the CPU 111 extracts a contour line and the like from a binary image of the frame image. Afterwards, the CPU 111 tries to extract the contour of the object imaged in the image. If the contour of the object is extracted, the CPU 111 regards the image in the contour as the commodity. If the commodity cannot be detected from the image (NO in ACT ST61), the commodity recognition processing is ended.

If the commodity can be detected from the image (YES in ACT ST61), the CPU 111 extracts appearance feature amount of the commodity from the image in the contour (ACT ST62: feature amount extraction function). The shape, the surface hue, the pattern, the concave-concave state and the like of the commodity are included in the appearance feature amount. If the appearance feature amount of the commodity is extracted, the CPU 111 accesses the HDD 214 of the POS terminal 2, and retrieves the recognition dictionary file 500 (ACT ST63). Afterwards, the CPU 111 reads a data record (the commodity ID, the commodity name, the commodity image data 0 to N and the feature amount data 0 to N) of one commodity from the recognition dictionary file 500 (ACT ST64).

If the data record of one commodity is read, the CPU 111 calculates a similarity degree for each feature amount data 0 to N of the record. The similarity degree is a value representing how similar the feature amount data 0 to N are to the appearance feature amount of the commodity extracted through the processing in ACT ST62. The CPU 111 determines the highest similarity degree in the similarity degrees calculated for each feature amount data 0 to N as the similarity degree between the recognition target commodity specified with the commodity ID of the record and the commodity captured by the camera 14 (ACT ST65: similarity degree calculation function). In addition, a total value or an average value of the similarity degrees calculated for each feature amount data 0 to N can be also determined as the similarity degree between the recognition target commodity and the captured commodity.

The CPU 111 confirms whether or not the similarity degree determined through the processing in ACT ST65 exceeds a preset candidate threshold value Lmin (ACT ST66). The candidate threshold value Lmin is a lower limit value of the similarity degree which retains the recognition target commodity as a candidate commodity. When the similarity degree does not exceed the candidate threshold value Lmin (NO in ACT ST66), the CPU 111 enters processing in ACT ST68.

When the similarity degree exceeds the candidate threshold value Lmin (YES in ACT ST66), the CPU 111 stores the similarity degree together with the commodity ID, the commodity name and the commodity image of the record in a candidate buffer of the RAM 113 (ACT ST67). The commodity image is obtained by, for example, selecting an image corresponding to the feature amount data having the highest similarity degree. Subsequently, the CPU 111 enters the processing in ACT ST68.

In ACT ST68, the CPU 111 confirms whether or not an unprocessed data record exists in the recognition dictionary file 500. If the unprocessed data record exists (YES in ACT ST68), the CPU 111 returns to carry out the processing in ACT ST64. Namely, the CPU 111 reads the unprocessed data record from the recognition dictionary file 500, and then executes the processing from ACT ST65 to ACT ST67 again.

When the unprocessed data record does not exist in the recognition dictionary file 500 (NO in ACT ST68), the commodity recognition processing is ended.

If the commodity recognition processing is ended, the CPU 111 retrieves the candidate buffer to confirm whether or not the commodity can be recognized from the captured image (ACT ST7). When the data are not stored in the candidate buffer, the commodity is not recognized. In this case (NO in ACT ST7), the CPU 111 returns to processing in ACT ST2. Namely, the CPU 111 confirms whether or not the keyboard 11 is operated, and executes processing following ACT ST3 again if the keyboard 11 is not operated.

If the data (the commodity ID, the commodity name, the image and the similarity degree) of at least one commodity are stored in the candidate buffer (YES in ACT ST7), the CPU 111 rearranges the data in the candidate buffer in the descending order of similarity degrees. Afterwards, the CPU 111 selects the data (the commodity ID, the commodity name, the image and the similarity degree) of which the similarity degrees are ranked from the first to the fifth, and registers the data in the candidate commodity memory 600 in a descending order (ACT ST8: candidate registration function). In addition, the CPU 111 displays the images of the candidate commodities in the candidate area 703 according to the order of the registration in the candidate commodity memory 600 (ACT ST9: candidate output function).

One example of the registration screen 700 displaying a candidate commodity image is illustrated in FIG. 8. In this example, "apple", "persimmon" and "peach" are recognized as the candidate commodities. The similarity degree of "apple" is the highest, and the similarity degree of "peach" is the lowest. In this case, as shown in FIG. 8, a button image 711 for selecting "apple", a button image 712 for selecting "persimmon" and a button image 713 for selecting "peach" are displayed in the candidate area 703.

If the button images 711, 712 and 713 of the candidate commodities are displayed, the CPU 111 confirms whether or not any one commodity in the candidate commodities is selected (ACT ST10). If any one button image is touched, the CPU 111 regards that the commodity displayed on the button image is selected.

If the commodity is not selected (NO in ACT ST10), the CPU 111 returns to the processing in ACT ST2. Namely, the CPU 111 confirms whether or not the keyboard 11 is operated, and executes the processing following ACT ST3 again if the keyboard 11 is not operated.

When the commodity is selected according to a signal from the touch panel sensor 12b (YES in ACT ST10), in order to reset the candidate of the commodity stored in the candidate commodity memory 600, the CPU 111 clears the candidate commodity memory 600 (ACT ST11). In addition, the CPU 111 erases the button images 711, 712 and 713 of the candidate commodities displayed in the candidate area 703 (ACT ST12). Afterwards, the CPU 111 determines the commodity ID of the selected commodity as the commodity ID of the commodity for sale (determination function). Afterwards, the CPU 111 sends the determined commodity ID to the POS terminal 2 through the communication cable 400 (ACT ST13).

After the commodity ID is sent, the CPU 111 returns to the processing in ACT ST2. Namely, the CPU 111 confirms whether or not the keyboard 11 is operated, and executes the processing following ACT ST3 again if the keyboard 11 is not operated.

If the barcode can be read from the image in ACT ST5 (YES in ACT ST5), the CPU 111 enters the processing in ACT ST11. Namely, in order to reset the candidate of the commodity stored in the candidate commodity memory 600, the CPU 111 clears the candidate commodity memory 600 (ACT ST11). In addition, the CPU 111 erases the button images 711, 712 and 713 of the candidate commodities displayed in the candidate area 703 (ACT ST12). Afterwards, the CPU 111 determines the commodity ID included in the barcode as the commodity ID of the commodity for sale. Afterwards, the CPU 111 sends the determined commodity ID to the POS terminal 2 through the communication cable 400 (ACT ST13).

If the key code is stored in the key buffer in ACT ST2 (YES in ACT ST2), the CPU 111 analyzes the key code, and confirms whether or not the commodity ID is input (ACT ST14). If other content rather than the commodity ID is input (NO in ACT ST14), the CPU 111 executes processing corresponding to the input.

When the commodity ID is input (YES in ACT ST14), the CPU 111 enters the processing in ACT ST11. Namely, in order to reset the candidate of the commodity stored in the candidate commodity memory 600, the CPU 111 clears the candidate commodity memory 600 (ACT ST11). In addition, the CPU 111 erases the button images 711, 712 and 713 of the candidate commodities displayed in the candidate area 703 (ACT ST12). Afterwards, the CPU 111 determines the input commodity ID as the commodity ID of the commodity for sale. Afterwards, the CPU 111 sends the determined commodity ID to the POS terminal 2 through the communication cable 400 (ACT ST13).

In order to acquire commodity information such as the commodity name, the unit price and the like of the commodity recognized with the commodity ID, the CPU 211 of the POS terminal 2 receiving the commodity ID retrieves a commodity master file. Afterwards, the CPU 211 carries out registration processing on the commodity sales data including a sales quantity and a sales amount based on the commodity information retrieved from the commodity master file. In addition, the CPU 211 sends each data of the commodity name, the unit price, the quantity and the amount to the commodity recognition apparatus 1 through the connection interface 217. The CPU 111 of the commodity recognition apparatus 1 displays each data of the commodity name, the unit price, the quantity and the amount received from the POS terminal 2 on the detail area 701 of the registration screen 700 displayed on the panel display section 12a and the display for customer 13.

In addition, a processing procedure of ACT ST11, ACT ST12 and ACT ST13 executed by the CPU 111 of the commodity recognition apparatus 1 is not limited to this. For example, the candidate commodity memory 600 can be cleared after the button images 711, 712 and 713 of the candidate commodities are erased. Alternatively, it may also be set that the determined commodity ID is sent to the POS terminal 2, then the candidate commodity memory 600 is cleared, and then the button images 711, 712 and 713 of the candidate commodities are erased.

Herein, the CPU 111 tries to read the commodity recognition code (commodity ID) from the commodity image acquired by the image interface 114, and functions as a processor for resetting the candidate of the commodity stored in the candidate commodity memory 600 if the commodity recognition code is read. In addition, if the commodity recognition code is read, the CPU 111 functions as a processor for erasing the candidate of the commodity displayed on a display (panel display section 12a). The keyboard 11 functions as an input device through which the commodity recognition code can be input. Afterwards, if the commodity recognition code is input through the input device, the CPU 111 functions as a processor for resetting the candidate of the commodity stored in the candidate commodity memory 600.

In the present embodiment, an operator of the commodity recognition apparatus 1 confirms whether or not a barcode is attached to a commodity M every time a commodity M is taken out one by one from the shopping basket 6. When the commodity M is attached with a barcode, the operator puts the surface of the commodity M with the barcode in front of the reading window 1B. When the commodity M is not attached with a barcode, the operator puts any surface of the commodity M in front of the reading window 1B.

The commodity M put in front of the reading window 1B is captured by the camera 14. In the commodity recognition apparatus 1, processing of reading the barcode from the frame image captured by the camera 14 is executed, and if the barcode cannot be read, the commodity recognition processing is executed. Afterwards, when the candidate commodity cannot be recognized, a next frame image is acquired, and barcode reading processing and the commodity recognition processing are executed.

On the other hand, when the candidate commodity is recognized through the commodity recognition processing, the data of the candidate commodity are stored in the candidate commodity memory 600. In addition, the image of the candidate commodity is displayed on the touch panel 12. However, when the commodity is not selected from the candidate commodity, the commodity recognition apparatus 1 acquires the next frame image, and executes the barcode reading processing and the commodity recognition processing.

Therefore, as to the commodity M without a barcode, the candidate commodity is recognized from a plurality of frame images captured during the commodity M is put in front of the reading window 1B by the operator, and the image of the commodity M is displayed on the touch panel 12. In that way, if the commodity M is displayed as the candidate commodity, the operator touches the image of the commodity M. In this way, the commodity ID of the commodity M is sent to the POS terminal 2 as the ID of the commodity for sale, and the commodity sales data are registered.

After the operator selects the commodity M from the candidate commodities, the candidate commodity memory 600 is cleared. In addition, the image of the candidate commodity displayed on the touch panel 12 is erased. Therefore, when the operator takes out a next commodity from the shopping basket 6 and puts it in front of the reading widow 1B, it can smoothly enter processing on the next commodity as the preceding candidate commodity is reset.

On the other hand, as to the commodity with a barcode, the barcode is read from the plurality of frame images captured when the operator puts the commodity in front of the reading window 1B. Afterwards, the commodity ID included in the barcode is sent to the POS terminal 2 as the ID of the commodity for sale, and the commodity sales data are registered.

If the barcode is read from the image of the commodity, the candidate commodity memory 600 is cleared. In addition, the image of the candidate commodity displayed on the touch panel 12 is erased. Therefore, when the operator takes out the next commodity from the shopping basket 6 and puts it in front of the reading widow 1B, it can also smoothly enter the processing on the next commodity as the preceding candidate commodity is reset.

However, although the operator puts a commodity with a barcode in front of the reading window 1B, the barcode sometimes cannot be read. For example, when the barcode is dirty, such an event happens. In this case, the operator operates the keyboard 11 to input the commodity ID.

In the commodity recognition apparatus 1, the candidate commodity memory 600 is also cleared even in a case where the commodity ID is input through a keyboard. In addition, the image of the candidate commodity displayed on the touch panel 12 is erased. Therefore, when the operator takes out a next commodity from the shopping basket 6 and puts it in front of the reading widow 1B, it can smoothly enter the processing on the next commodity as the preceding candidate commodity is reset.

Therefore, through the commodity recognition apparatus 1 according to the present embodiment, no matter whether or not a barcode is attached to a commodity, an effect of lightening a burden on the operator required until the commodity is successfully recognized can be achieved.

A Second Embodiment

In the first embodiment, the CPU 111 of the commodity recognition apparatus 1 first executes the barcode reading processing (ACT ST4), and then executes the commodity recognition processing (ACT ST6). The processing uses the same frame image captured by the camera 14. Therefore, the commodity recognition processing can be also executed first, and then the barcode reading processing is executed. In the second embodiment, the CPU 111 of the commodity recognition apparatus 1 first executes the commodity recognition processing, and then executes the barcode reading processing.

Figure 9:
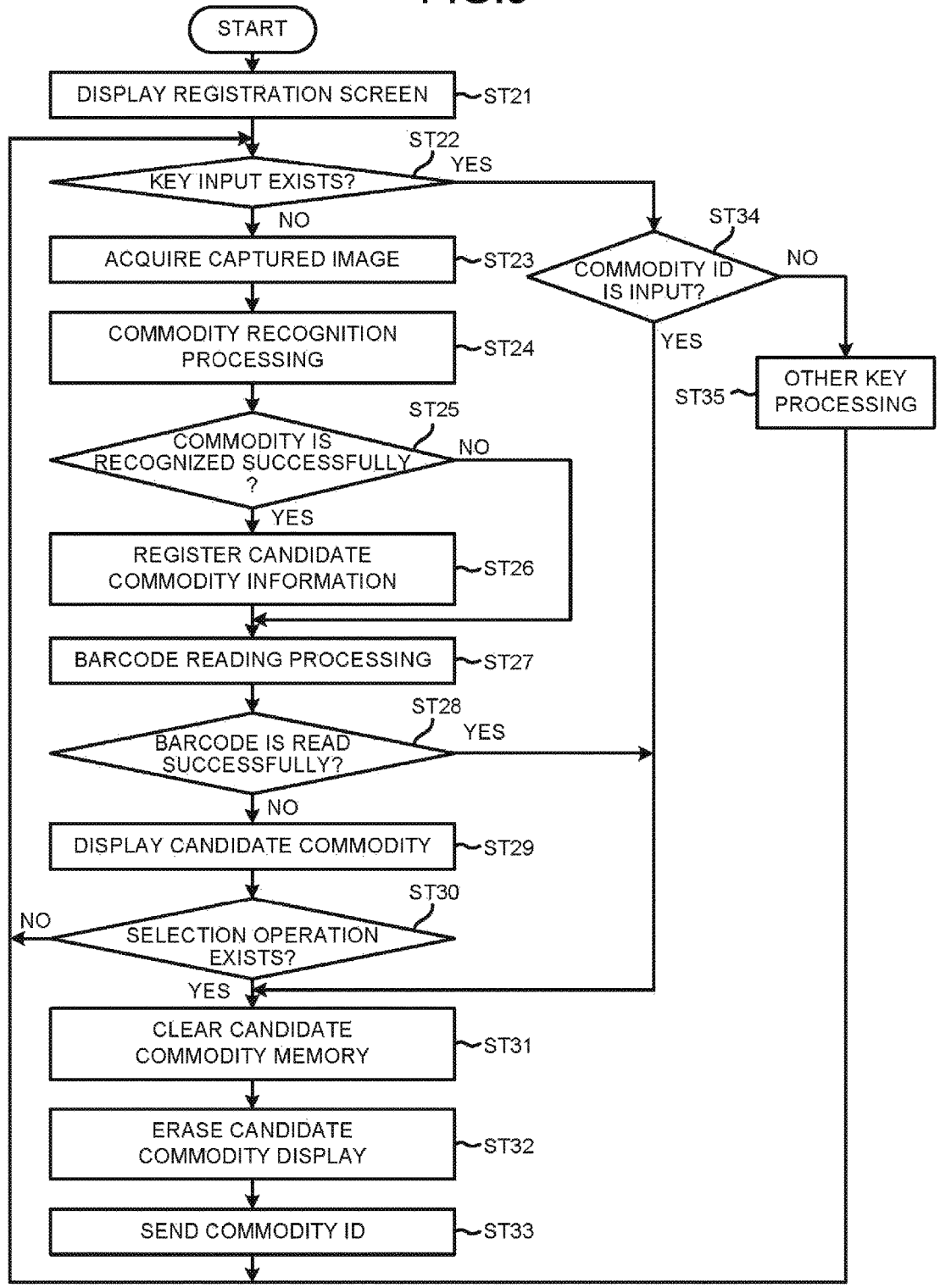
FIG. 9 is a flowchart illustrating other procedure of the information processing executed by the CPU of the commodity recognition apparatus according to the commodity recognition program.

FIG. 9 is a flowchart illustrating a procedure of the information processing executed by the CPU 111 according to the commodity recognition program in the second embodiment. First, the CPU 111 displays the registration screen 700 on the panel display section 12a of the touch panel 12 (ACT ST21). Next, the CPU 111 confirms whether or not the keyboard 11 is operated (ACT ST22).

If it is determined that the key input does not exist (NO in ACT ST22), the CPU 111 executes the commodity recognition processing (ACT ST24). A specific procedure of the commodity recognition processing is the same as that in the first embodiment. Therefore, FIG. 6 is also used in the second embodiment and is not repeatedly described.

If the commodity recognition processing is ended, the CPU 111 confirms whether or not the commodity can be recognized from the captured image (ACT ST25). If the commodity cannot be recognized (NO in ACT ST25), the CPU 111 enters the processing in ACT ST27.

If the commodity is recognized (YES in ACT ST25), the CPU 111 rearranges the data in the candidate buffer in the descending order of similarity degrees. Afterwards, the CPU 111 selects the data (the commodity ID, the commodity name, the image and the similarity degree) of which the similarity degrees are ranked from the first to the fifth, and then registers the data in the candidate commodity memory 600 (ACT ST26). Subsequently, the CPU 111 enters the processing in ACT ST27.

In ACT ST27, the CPU 111 executes the barcode reading processing. Namely, the CPU 111 analyzes the image stored in the image buffer and reads the barcode. If the barcode cannot be read (NO in ACT ST28), the CPU 111 displays the image of the candidate commodity in the candidate area 703 according to the order of the registration in the candidate commodity memory 600 (ACT ST29). Afterwards, the CPU 111 confirms whether or not one commodity is selected from the candidate commodities (ACT ST30).

If the commodity is not selected (NO in ACT ST30), the CPU 111 returns to the processing in ACT ST22. Namely, the CPU 111 confirms whether or not the keyboard 11 is operated, and executes the processing following ACT ST23 again if the keyboard 11 is not operated.

If the commodity is selected (YES in ACT ST30), in ACT ST31 to ACT ST33, the CPU 111 executes processing the same as that in ACT ST11 to ACT ST13 in the first embodiment. When the barcode can be read from the image (YES in ACT ST28), or the commodity ID is input (YES in ACT ST34), the CPU 111 executes the processing the same as that in ACT ST11 to ACT ST13 in the first embodiment in ACT ST31 to ACT ST33. Therefore, in the commodity recognition apparatus according to the second embodiment, the same effect as the commodity recognition apparatus 1 according to the first embodiment can be also achieved.

In addition, the present invention is not limited to these embodiments.

For example, in the embodiments mentioned above, the CPU 111 of the commodity recognition apparatus 1 has all functions as a processor. The functions as the processor can also be dispersed to the CPU 111 of the commodity recognition apparatus 1 and the CPU 211 of the POS terminal 2. Alternatively, the commodity recognition apparatus 1 is incorporated in the POS terminal 2, and the CPU 211 of the POS terminal 2 has the functions as the processor. In this case, the area serving as the candidate commodity memory 600 is guaranteed in the RAM 213 of the POS terminal 2.

In addition, in the embodiments above, the keyboard 11 is exemplarily illustrated as an input device through which the commodity recognition code can be input. Other input device rather than the keyboard can be used instead of the keyboard 11 as long as the commodity recognition code can be input through the input device. Alternatively, a hand-held barcode scanner can also be used as the input device.

In addition, in the embodiments above, a control program realizing the functions of the present invention is prerecorded in the ROM 112 serving as a program storage section inside the apparatus. However, it is not limited to this. The same program can be also downloaded to the apparatus from a network. Alternatively, the same program recorded in a recording medium can be also installed in the apparatus. The form of the recording medium is not limited as long as the recording medium can store programs like a CD-ROM and a memory card and is readable by an apparatus. Further, the function realized by an installed or downloaded program can also be realized through the cooperation with an OS (Operating System) installed in the apparatus. In addition, the program of the present embodiment can be also incorporated in a portable information terminal like a mobile phone with a communication function or a so-called PDA to realize the functions.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:
an image interface configured to acquire a commodity image captured by a single common camera;
a connection interface with a terminal which registers commodity sales data;
a display;
a memory; and
a processor configured to try to read a commodity recognition code from the commodity image acquired through the image interface,
wherein, in response to the commodity recognition code being not successfully read, the processor recognizes a candidate of a commodity from the commodity image from which the processor has tried to read the commodity recognition code, wherein the processor recognizes the candidate by 1) extracting feature data from the commodity image, wherein the feature data comprises a function of a shape of the candidate, a surface hue of the candidate, a pattern of the candidate, and a concave-convex shape of the candidate, 2) parameterizing the feature data, and 3) matching parameterized feature data to feature data representing objects in a recognition dictionary database, wherein the processor recognizes the candidate with a highest similarity score, stores the recognized candidate of the commodity in the memory, and displays, in a candidate area of the display, the candidate of the commodity stored in the memory, and in response to the the commodity recognition code being successfully read while the candidate of the commodity is displayed in the candidate area of the display, the processor clears the candidate of the commodity stored in the memory by using successful reading of the commodity recognition code as a trigger, and erases the display of the candidate area, and sends the commodity recognition code successfully read to the terminal through the connection interface.

2. The commodity recognition apparatus according to claim 1, wherein the display includes a function of a touch panel.

3. A commodity recognition apparatus, comprising:
an image interface configured to acquire a commodity image captured by a single common camera;
a connection interface with a terminal which registers commodity sales data;
a display;

a memory; and a processor configured to recognize a candidate of a commodity from the commodity image acquired through the image interface, wherein the processor recognizes the candidate by 1) extracting feature data from the commodity image, wherein the feature data comprises a function of a shape of the candidate, a surface hue of the candidate, a pattern of the candidate, and a concave-convex shape of the candidate, 2) parameterizing the feature data, and 3) matching parameterized feature data to feature data representing objects in a recognition dictionary database, wherein the processor recognizes the candidate with a highest similarity score, store the recognized candidate of the commodity in the memory, try to read a commodity recognition code from the commodity image from which the candidate of the commodity is recognized, wherein if the commodity recognition code is not successfully read, the processor displays, in a candidate area of the display, the candidate of the commodity stored in the memory, and if the commodity recognition code is successfully read while the recognized candidate of the commodity is displayed in the candidate area of the display, the processor clears the recognized candidate of the commodity stored in the memory by using successful reading of the commodity recognition code as a trigger, and erases the display of the candidate area, and sends the commodity recognition code to the terminal through the connection interface.

4. The commodity recognition apparatus according to claim 3, wherein the display includes a function of a touch panel.

5. A commodity recognition method, comprising:

trying to read a commodity recognition code from a commodity image captured by a single common camera acquired through an image interface;

in response to the commodity recognition code being not successfully read, recognizing a candidate of a commodity from the commodity image from which an attempt to read the commodity recognition code was made, wherein the recognizing the candidate comprises 1) extracting feature data from the commodity image, wherein the feature data comprises a function of a shape of the candidate, a surface hue of the candidate, a pattern of the candidate, and a concave-convex shape of the candidate, 2) parameterizing the feature data, and 3) matching parameterized feature data to feature data representing objects in a recognition dictionary database, wherein the recognizing the candidate comprises determining the candidate with a highest similarity score, storing the recognized candidate of the commodity in a memory, and displaying, in a candidate area of a display, the candidate of the commodity stored in the memory; and in response to the commodity recognition code being successfully read while the candidate of the commodity is displayed in the candidate area of the display, clearing the candidate of the commodity stored in the memory by using successful reading of the commodity recognition code as a trigger, and erasing the display of the candidate area, and sending the commodity recognition code successfully read to a terminal through a connection interface.

6. A commodity recognition method, comprising:

recognizing a candidate of a commodity from a commodity image captured by a single common camera acquired through an image interface, wherein the recognizing the candidate comprises 1) extracting feature data from the commodity image, wherein the feature data comprises a function of a shape of the candidate, a surface hue of the candidate, a pattern of the candidate, and a concave-convex shape of the candidate, 2) parameterizing the feature data, and 3) matching parameterized feature data to feature data representing objects in a recognition dictionary database, wherein the recognizing the candidate comprises determining the candidate with a highest similarity score and storing the recognized candidate of the commodity in a memory;

trying to read a commodity recognition code from the commodity image from which the candidate of the commodity is recognized;

if the commodity recognition code is not successfully read, displaying, in a candidate area of a display, the candidate of the commodity stored in the memory; and if the commodity recognition code is successfully read while the recognized candidate of the commodity is displayed in the candidate area, clearing the recognized candidate of the commodity stored in the memory by using successful reading of the commodity recognition code as a trigger, and erasing the display of the candidate area, and sending the commodity recognition code to a terminal through a connection interface.

* * * * *